(12) United States Patent
Tamano

(10) Patent No.: US 8,706,724 B2
(45) Date of Patent: Apr. 22, 2014

(54) FEATURE EXTRACTION DEVICE AND FEATURE EXTRACTION METHOD

(75) Inventor: Hiroshi Tamano, Tokyo (JP)

(73) Assignee: NEC Corporation, Tokyo (JP)

( * ) Notice: Subject to any disclaimer, the term of this patent is extended or adjusted under 35 U.S.C. 154(b) by 171 days.

(21) Appl. No.: 13/379,616

(22) PCT Filed: Jun. 21, 2010

(86) PCT No.: PCT/JP2010/060918
§ 371 (c)(1),
(2), (4) Date: Dec. 20, 2011

(87) PCT Pub. No.: WO2010/150900
PCT Pub. Date: Dec. 29, 2010

(65) Prior Publication Data
US 2012/0102046 A1    Apr. 26, 2012

(30) Foreign Application Priority Data

Jun. 24, 2009    (JP) ................................. 2009-150107

(51) Int. Cl.
*G06F 7/00* (2006.01)
*G06F 17/30* (2006.01)

(52) U.S. Cl.
USPC .......................................... 707/728; 707/729

(58) Field of Classification Search
USPC ................................................. 707/728–731
See application file for complete search history.

(56) References Cited

U.S. PATENT DOCUMENTS 7,464,331 B2 * 12/2008 Patch et al. .................... 715/237
2004/0117449 A1 * 6/2004 Newman et al. .............. 709/206
2005/0120114 A1 * 6/2005 Nadamoto et al. ............ 709/225
2007/0206221 A1 * 9/2007 Wyler et al. ................... 358/1.15
2012/0143841 A1 * 6/2012 Epstein .......................... 707/706

FOREIGN PATENT DOCUMENTS

| JP | 6-215049 A | 8/1994 |
|---|---|---|
| JP | 2007149022 A | 6/2007 |
| JP | 2007316743 A | 12/2007 |
| WO | WO 2010136763 A1 * | 12/2010 |

OTHER PUBLICATIONS

International Search Report for PCT/JP2010/060918 mailed Aug. 3, 2010.
H. Kinutani et al., "A Retrieval Method for Partial XML Documents Using Their Structures and Contents", Information Processing Society of Japan, Mar. 2002, vol. 43, No. SIG 2(TOD 13) pp. 80-93.

* cited by examiner

*Primary Examiner* — James E Richardson
(74) *Attorney, Agent, or Firm* — Sughrue Mion, PLLC

(57) ABSTRACT

A feature extraction device obtains a partial feature vector having the precision required for the partial document. The feature extraction device searches a document tree, and detects elements as search elements. The device calculates an inter-element distance between an extraction target element within elements of the document tree and the search element. The device refers to an exclusive element name and generates exclusivity information indicating, for the extraction target element, whether the search element is the exclusive element. The device calculates, based on an inter-element distance and the exclusivity information, a weight for a word included in the element, and relates and calculates, for each search element, based on weights, an element feature vector having each of dimensions that uniquely corresponds to a word. The device calculates based on the element feature vector, a partial document feature vector of a partial document related to the extracted target element.

20 Claims, 11 Drawing Sheets

FEATURE EXTRACTION DEVICE AND FEATURE EXTRACTION METHOD

TECHNICAL FIELD

The present invention relates to a feature extraction device, a feature extraction method and a program which extract feature information of a document.

BACKGROUND ART

Generally, when document classification or the like of an electronic document is performed using a computer or the like, feature information on the electronic document is used.

Here, the document classification (Document classification/categorization) means that it classifies an electronic document into several classes based on the contents. The document classification is used, for example, for a spam filter of an e-mail system or the like. The spam filter determines whether a mail newly received is a spam mail with reference to information about a spam mail which has already been received and a mark has been putted on. And the spam filter sorts into a specific folder or the like in case the mail is the spam mail.

In work of the document classification like these, a document is expressed by a multidimensional vector. The multidimensional vector which expresses a document is also called a feature vector. For example, each dimension of the feature vector is corresponding to each word which appears in the document. And then, as a value of each component of the feature vector, for example, the number of appearances or the TF (Term Frequency)-IDF (Inverse Document Frequency) value which represents an importance or the like of the word, which is corresponding to the dimension of the component, is used. For example, the number of dimensions (the number of components) of the feature vector corresponds to the total number of words to be dealt with.

When indicating a specific example, for example, the following document d1 can be expressed by the following feature vector v1.

Document d1: "A document is represented as a vector. Each dimension corresponds to a separate term. If a term occurs in the document, its value in the vector is no zero."

Feature vector v1: [4, 0, . . . , 1, . . . , 2, . . . , 0]

Here, the feature vector v1 includes a plurality of components, and each component is corresponding to a single word.

And then, an arrangement sequence of those components is alphabetical order of the corresponding word. And then, the value of each component is expressed by the number of appearances of the corresponding word in the document d1. In other words, it represents that the first component of the feature vector v1 corresponds to the word "a", and the word "a" appears 4 times in the document d1. Also, the second component is corresponding to the second word in alphabetical order among the words to be dealt with. And, supposing that the second word in alphabetical order is "about", the value will be 0 because "about" does not appear in the document d1. When looking at components of the feature vector v1 in order, the word which is next young in alphabetical order and appears in the document d1 is "as". The word "as" appears once in the document d1. Accordingly, the value of the corresponding component is "1". And, the word "document", which appears next, appears twice in the document d1. Accordingly, the value is "2". By expressing a document as a feature vector in this way, it is possible for the document to be corresponded to 1 point on a high dimensional vector space.

In the document classification, the document is expressed in the feature vector using various methods including an example mentioned above, and the document is classified based on the distance between the feature vectors. Accordingly, generation of the feature vector in the document classification is a very important technical element because the precision of the document classification varies largely depending on the precision of the feature vector.

These technological examples which extract feature information on the document are disclosed in patent document 1 and patent document 2.

Next, in case a document includes several parts of gathered contents, there is an application which adopts the document classification to each of those. For example, the application is that, when information on a plurality of seminars is included in a notification mail of the seminar which is being sent by an e-mail, it applies, by breaking those down into information on each seminar, classifying into each of categories. Henceforth, the document of certain gathered contents included in a document is called a partial document, and classifying a partial document is called a partial document classification.

In such partial document classification, it needs to specify a partial document correctly from the whole document. For example, by catching changes in the tendency of appearance phrases in the document, it is possible to divide a document into a partial document. In addition, the phrase may be a word or phrase. In addition, it is similar as follows. However, because there are few changes in the appearance phrases when the partial documents are related to each other, such approach does not have the enough validity.

When aiming at a semi-structured document having structural information, as indicated in non-patent document 1, the heuristics which specifies a partial document is proposed. A partial document specifying method disclosed in non-patent document 1 pays attention to the behavior that elements having the same name appear in parallel at the same level in the structure of the document tree when the semi-structured document includes several topics (partial documents). This partial document specifying method, when elements of the document tree are traced to a root from a leaf, determines the element for which the same name appears in the element of a sibling relationship for the first time as a root of the partial document tree. By using this method, for the semi-structured document, it specifies a partial document and extracts those feature information using technology disclosed in patent document 1 or 2, and can classify the partial document.

PATENT DOCUMENT

[Patent document 1] Japanese Patent Application Publication No. 2007-149022

[Patent document 2] Japanese Patent Application Publication No. 06-215049

Non-Patent Document

[Non-patent document 1] Kinutani Hiroko, three others. "A Retrieval Method for Partial XML Documents Using Their Structures and Contents" Information Processing Society of Japan, May 2002, Vol. 43 No. SIG 2 (TOD 13) p. 80-93

SUMMARY OF THE INVENTION

Problem to be Solved by the Invention

In the related prior art mentioned above, there was a problem that there was a case where it could not obtain the partial feature vector having the precision required for the partial document.

The reason is as follows. First, in the partial document classification as indicated by patent documents 1 and 2 mentioned above, the feature vector is created based on the appearance word. On the other hand, the partial document is a part of the usual document or a set of the parts, and its size may be small relatively. Accordingly, the smaller size that the partial document has, the sparser feature vector that is created based on the appearance word, and it is because the feature of the partial document cannot be expressed sufficiently.

The object of the present invention is to provide a feature extraction device, a feature extraction method and a program which solve the problem mentioned above.

Means for Solving a Problem

A feature extraction device of the present invention includes search unit which searches a document tree having a plurality of elements according to a rule given in advance, and sequentially detects said element as a search element;

distance calculation unit which calculates an inter-element distance between an extraction target element specified in advance among a plurality of elements of said document tree and said search element;

exclusive element confirmation unit which generates exclusivity information which indicates whether said search element is an exclusive element to said extraction target element with reference to an exclusive element name specified in advance;

element feature vector calculation unit which calculates a weight for a phrase included in the element corresponding to said element based on the inter-element distance and said exclusivity information, and calculates an element feature vector, having a plurality of dimensions and each dimension uniquely corresponding to a predetermined phrase, based on the calculated weight corresponding to each search element; and partial document feature vector calculation unit which calculates a partial document feature vector of a partial document related to said extraction target element based on said element feature vector.

A feature extraction method of the present invention searches a document tree having a plurality of elements according to a rule given in advance, and sequentially detects said element as a search element;

calculates an inter-element distance between an extraction target element specified in advance among a plurality of elements of said document tree and said search element;

generates exclusivity information which indicates whether said search element is an exclusive element to said extraction target element, with reference to an exclusive element name specified in advance;

calculates a weight for a phrase included in the element corresponding to said element based on the inter-element distance and said exclusivity information, and calculates an element feature vector, having a plurality of dimensions and each dimension uniquely corresponding to a predetermined phrase, based on the calculated weight corresponding to each search element; and calculates a partial document feature vector of a partial document related to said extraction target element based on said element feature vector.

A program of the present invention makes a computer to execute the process of searching a document tree having a plurality of elements according to a rule given in advance, and sequentially detecting said element as a search element;

calculating an inter-element distance between an extraction target element specified in advance among a plurality of elements of said document tree and said search element;

generating exclusivity information which indicates whether said search element is an exclusive element to said extraction target element, with reference to an exclusive element name specified in advance;

calculating a weight for a phrase included in the element corresponding to said element based on the inter-element distance and said exclusivity information, and calculating an element feature vector, having a plurality of dimensions and each dimension uniquely corresponding to a predetermined phrase, based on the calculated weight corresponding to each search element; and calculating a partial document feature vector of a partial document related to said extraction target element based on said element feature vector.

A recording medium of the present invention having embodied thereon a program for causing a computer to execute:

search element detection processing for searching a document tree having a plurality of elements according to a rule given in advance, and sequentially detecting said element as a search element;

inter-element distance calculation processing for calculating an inter-element distance between an extraction target element specified in advance among a plurality of elements of said document tree and said search element;

exclusivity information generation processing for generating exclusivity information which indicates whether said search element is an exclusive element to said extraction target element, with reference to an exclusive element name specified in advance;

element feature vector calculation processing for calculating a weight for a phrase included in the element corresponding to said element based on the inter-element distance and said exclusivity information, and calculating an element feature vector, having a plurality of dimensions and each dimension uniquely corresponding to a predetermined phrase, based on the calculated weight corresponding to each search element; and partial document feature vector calculation processing for calculating a partial document feature vector of a partial document related to said extraction target element based on said element feature vector.

Effect of the Invention

According to the present invention, the partial feature vector having the precision required for the partial document can be obtained.

EXEMPLARY EMBODIMENTS FOR CARRYING OUT OF THE INVENTION

The first exemplary embodiment of the present invention will be described in detail with reference to drawings.

First Exemplary Embodiment

Figure 1:
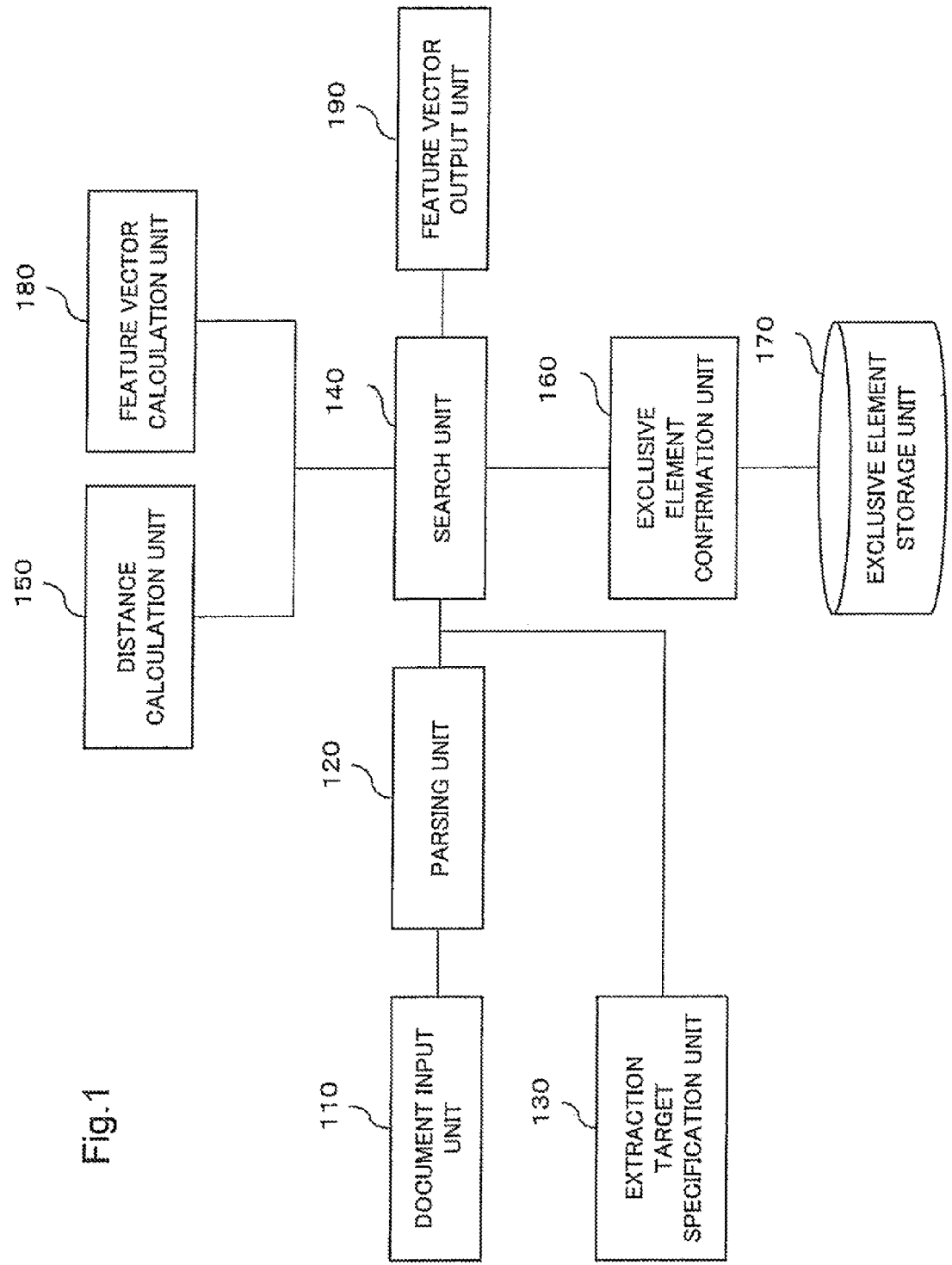
FIG. 1 is a block diagram showing a configuration of the first exemplary embodiment of the present invention.

FIG. 1 is a block diagram showing a configuration of the first exemplary embodiment. As shown in FIG. 1, the first exemplary embodiment includes a document input unit 110, a parsing unit 120, an extraction target specification means 130, a search unit 140, a distance calculation unit 150, an exclusive element confirmation unit 160, an exclusive element storage unit 170, a feature vector calculation unit 180 and a feature vector output unit 190.

Figure 3:
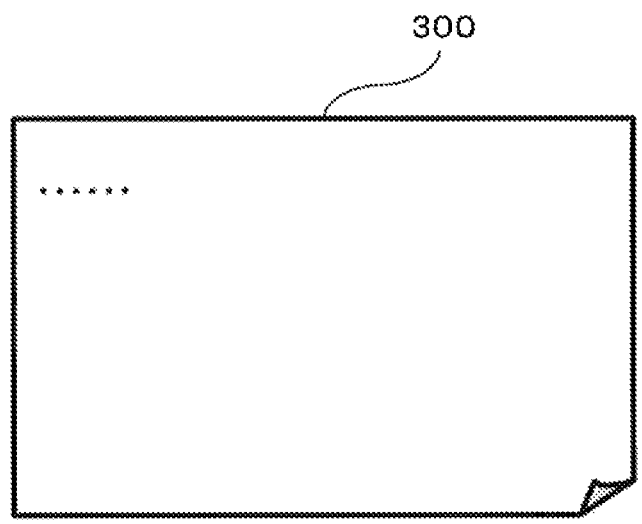
FIG. 3 is a figure showing a structure of the document in the first to third exemplary embodiments of the present invention.

First, the document input unit 110 will be described. The document input unit 110 inputs a document 300 as shown in FIG. 3. In a description of this exemplary embodiment, it is supposed that the document 300 is a semi-structured document.

Followings are examples of the specific contents of the document 300.

```
<chapter title= "outline">
<section title= "basic concept">
<sentence>
XML is a mark according to the individual purpose
in order to create an up language group....
</sentence>
<sentence>
the most important purpose of XML is different information
between the systems....
</sentence>
</section>
<section title= "open specification">
</section>
</chapter>
```

Next, the parsing unit 120 will be described. The parsing unit 120 analyzes the document 300 inputted by the document input unit 110, expands to a tree structure and generates a document tree 310 as shown in FIG. 4.

Figure 4:
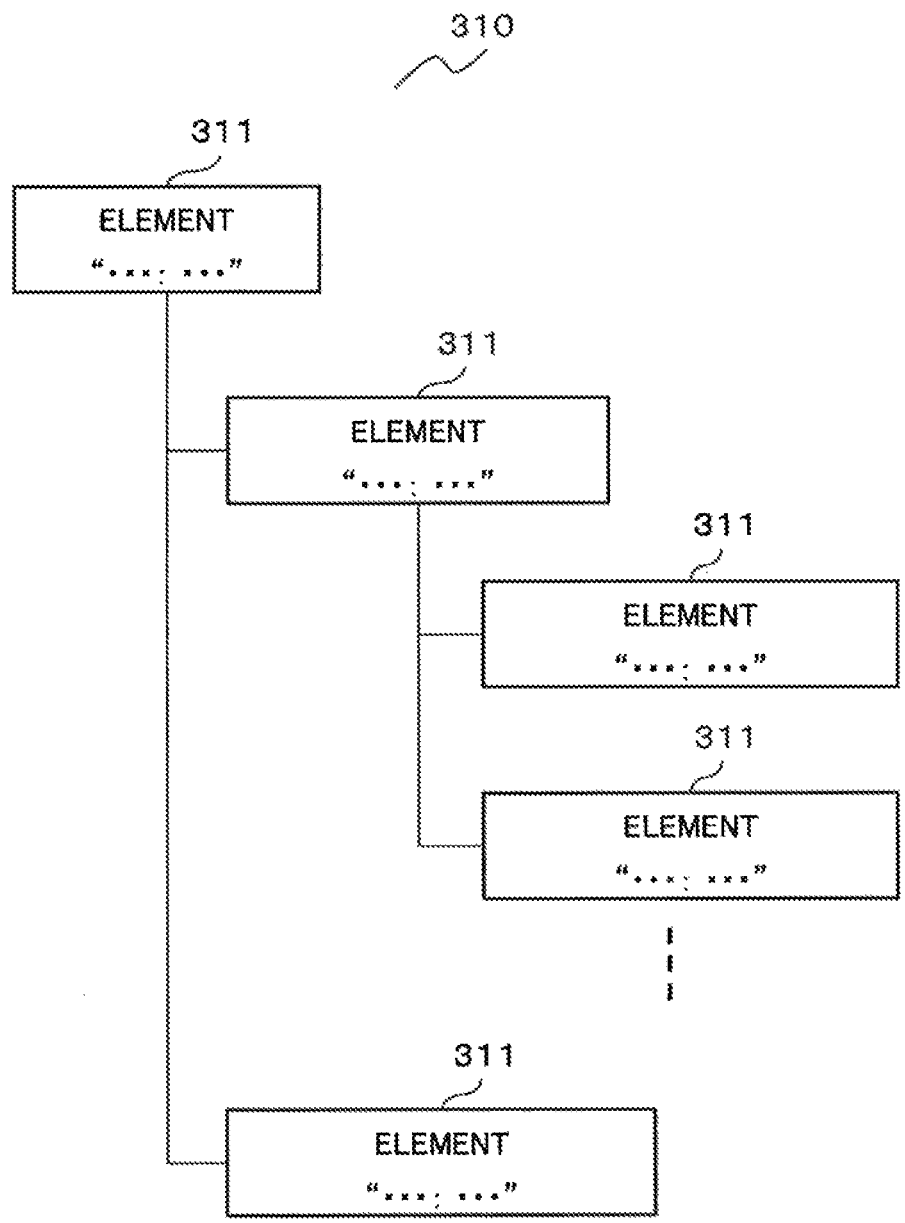
FIG. 4 is a figure showing a structure of the document tree in the first to third exemplary embodiments of the present invention.

FIG. 4 expresses the state in which the document 300 described in the XML (eXtensible Markup Language) form has been expanded to the document tree 310. The document tree 310 includes a plurality of elements 311. The element 311 includes an element name and contents of element, and in FIG. 4, this is indicated just like ["an element name: contents of element"].

For example, specific examples of ["an element name: contents of element"] are ["chapter: outline"], ["section: basic concept"], ["sentence: XML is an individual . . . "], [sentence: most . . . of XML"] and ["section: an open specification"] or the like.

Further, the parsing unit 120 may be configured so that it can analyze not only XML form, but also a semi-structured document such as, for example, S (symbolic) expression.

Next, the extraction target specification unit 130 will be described. The extraction target specification unit 130 specifies a feature vector (hereinafter, referred to as "a partial document feature vector") to be extracted for the partial document relating to which part of the document 300. Specifically, the extraction target specification unit 130 specifies any one of a plurality of elements 311 included in the document tree 310 uniquely, using, for example, XPath (XML Path Language) or the form such as the nth xx element. In the description below, this element 311 specified uniquely is called an extraction target element 312.

Further, the specification method by the extraction target specification unit 130 mentioned above is only an example, and other method may also be applicable as far as it can specify any one of elements 311 of the document tree 310 uniquely.

Next, the search unit 140 will be described. The search unit 140 searches the document tree 310 to a root element direction by starting from the element 311 of an extraction target (referred to as an extraction target element 312), and detects each one of elements 311 existing there as a search element. Continuously, the search unit 140 causes the distance calculation unit 150, the exclusive element confirmation unit 160 and the feature vector calculation unit 180 to execute processing on the detected search element.

In this way, the search unit 140 searches up as far as the element 311 of root of the document tree 310 (referred to as a root element 313), and extracts a partial document feature vector about the element 311 specified as the extraction target element 312.

Figure 5:
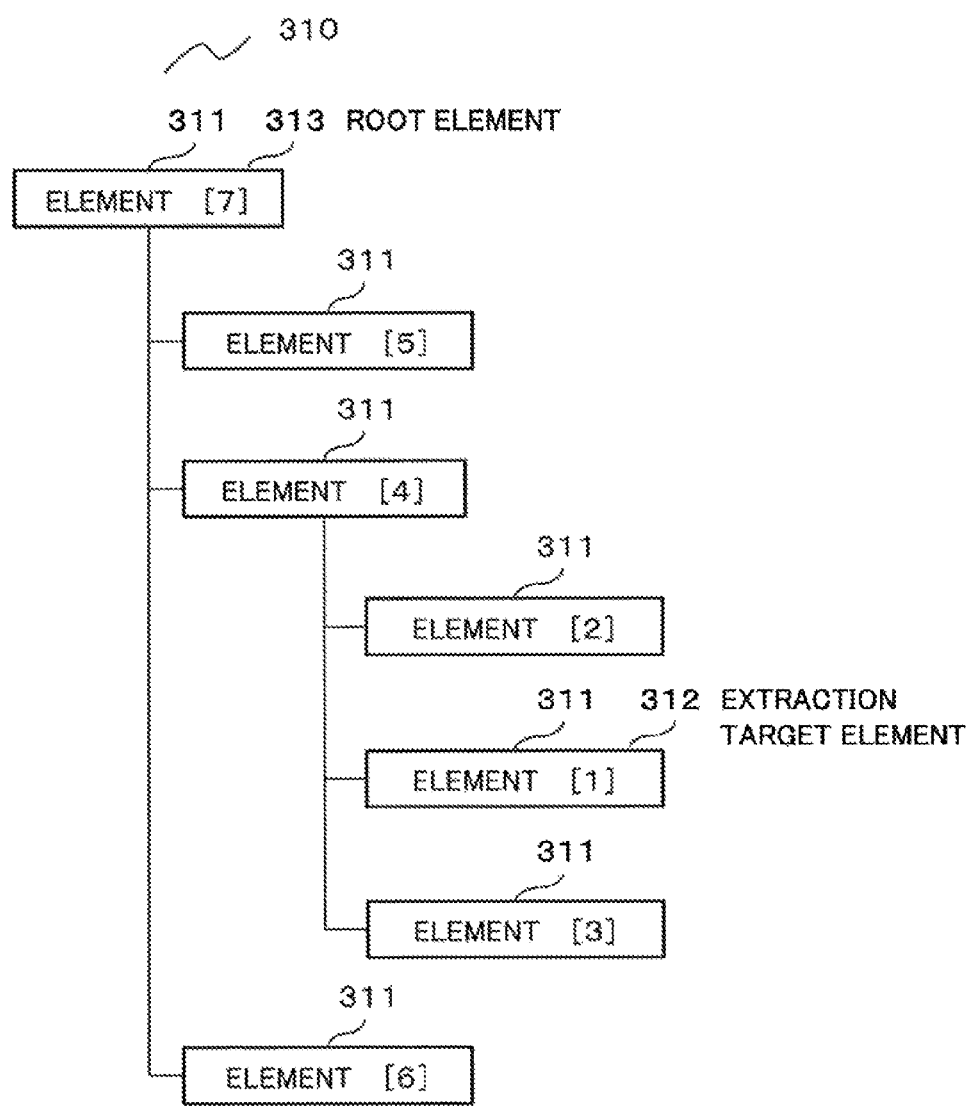
FIG. 5 is a figure of the document tree which indicates an example of search operation of a search unit in the first to third exemplary embodiments of the present invention.

An example of search operation by the search unit 140 will be described with reference to FIG. 5. FIG. 5 is a figure indicating search order in the document tree 310 by a parenthetic number between square brackets "[" and "]" in a case where the element 311 [1] is the extraction target element 312. For example, "element 311 [1]" indicates the element 311 of the first search order, and also similar for other elements 311.

The search unit 140 performs a search from the top to the bottom in a sibling direction of the document tree 310 except for the extraction target element 312 or the element 311 which includes the extraction target element 312 as a child element. And, after having finished the search in the sibling direction, the search in a parent direction is performed. This search order is only an example and other order may also be fine.

Next, the distance calculation unit 150 will be described. The distance calculation unit 150 calculates an inter-element distance between a certain element 311 and other element 311 in the document tree 310.

Here, it can consider a method for calculating the inter-element distance based on various distance functions. Three examples will be described with reference to FIG. 5.

Method 1 is based on a distance function when the document 300, which is being expressed by the document tree 310 after parsing, is converted again into text in order of easy to be read for man. That is, the inter-element distance is the absolute value of order difference in case of ordering by preorder of the document tree 310 (to follow a tree by preorder corresponds to operation of reading a document 300 sequentially from the top by a person). When the document tree 310 of FIG. 5 is followed by preorder from the element 311 [7], the order will be element 311 [7]→element 311 [5]→element 311 [4]→element 311 [2]→element 311 [1]→element 311 [3]→element 311 [6]. Accordingly, in FIG. 5 for example, the inter-element distance between the element 311 [1] and the element 311 [7] is 4, and the inter-element distance between the element 311 [1] and the element 311 [6] is 2.

Method 2 is based on a distance function when defining the distance only in a parental relationship among elements of the document tree 310. That is, the inter-element distance is the minimum required number of transitions in a parental direction in order to reach the other element 311 from one element 311. Accordingly, in FIG. 5 for example, the inter-element distance between the element 311 [1] and the element 311 [6] is 1, and the inter-element distance between the element 311 [1] and the element 311 [7] is 2.

Method 3 is based on a distance function when defining the distance between elements also in a sibling relationship, in addition to the definition of the distance in method 2.

That is, first, the inter-element distance, in a case where two elements 311 are in a sibling relationship, is the number of transitions required to transfer from one element 311 to the other element 311.

Further, in a case where two elements 311 are in a parental relationship, the inter-element distance is the number of child elements held by a parent element+1.

Next, the inter-element distance in an ancestor-descendant relationship will be described. Here, it is supposed that the elements 311 existing on the pass form a certain element 311A to a root element 313 are called ancestor elements (the element 311A itself is also one of the ancestor elements). Also, it is supposed that a certain element 311 seen from the ancestor element is called a descendant element. In a case where two of the elements 311 are in the relation of the ancestor element and the descendant element, the inter-element distance is sum total of the respective distances of the parental relationships from the descendant element to the ancestor element.

Finally, with respect to the inter-element distance in a case where two elements 311 are none of the sibling relationship, the parental relationship and the ancestor-descendant relationship, two of the elements 311 will be described as the element 311D and the element 311B. First, the distance calculation unit 150 selects the element 311A which is the parental relationship with the element 311D which is any one of the ancestor elements of the element 311D, and also is the closest ancestor element of the element 311B. And then, the distance calculation unit 150 calculates "the distance from element 311D to element 311A+the distance from element 311A to element 311B" as the inter-element distance between the element 311D and the element 311B.

For example, in FIG. 5, the inter-element distance between the element 311 [2] and the element 311 [3] is 2 because of the sibling relationship. Similarly, the inter-element distance between the element 311 [2] and the element 311 [4] is 4 because of the parental relationship. Similarly, the inter-element distance between the element 311 [1] and the element 311 [7] is 4+4=8 because of the ancestor-descendant relationship. Similarly, the inter-element distance between the element 311 [1] and the element 311 [6] is 4+1=5 because of none of the sibling relationship, the parental relationship and the ancestor-descendant relationship.

These are the description of method 3 to calculate the inter-element distance.

Although three calculation methods of the inter-element distance have been described above, these are only examples and other method may also be applicable.

Next, the exclusive element confirmation unit 160 will be described. The exclusive element confirmation unit 160 acquires information on an exclusive element from the exclusive element storage unit 170. Next, the exclusive element confirmation unit 160 examines whether an identical exclusive element exists in each of partial trees which use two elements 311 as the tops.

Here, the exclusive element is an element 311 to be used for each describing a different topic. When an element 311 is the exclusive element, the element name is, for example, "chapter", "event" or "schedule" or the like. These element names of the exclusive elements are stored in the exclusive element storage unit 170. For example, when a partial document about a certain schedule is extracted, information about other schedules needs to be excluded. Therefore, the exclusive element confirmation unit 160 examines whether an element 311 having the same element name as the exclusive element is included in each of the partial trees which use two elements 311 as the tops.

Figure 6:
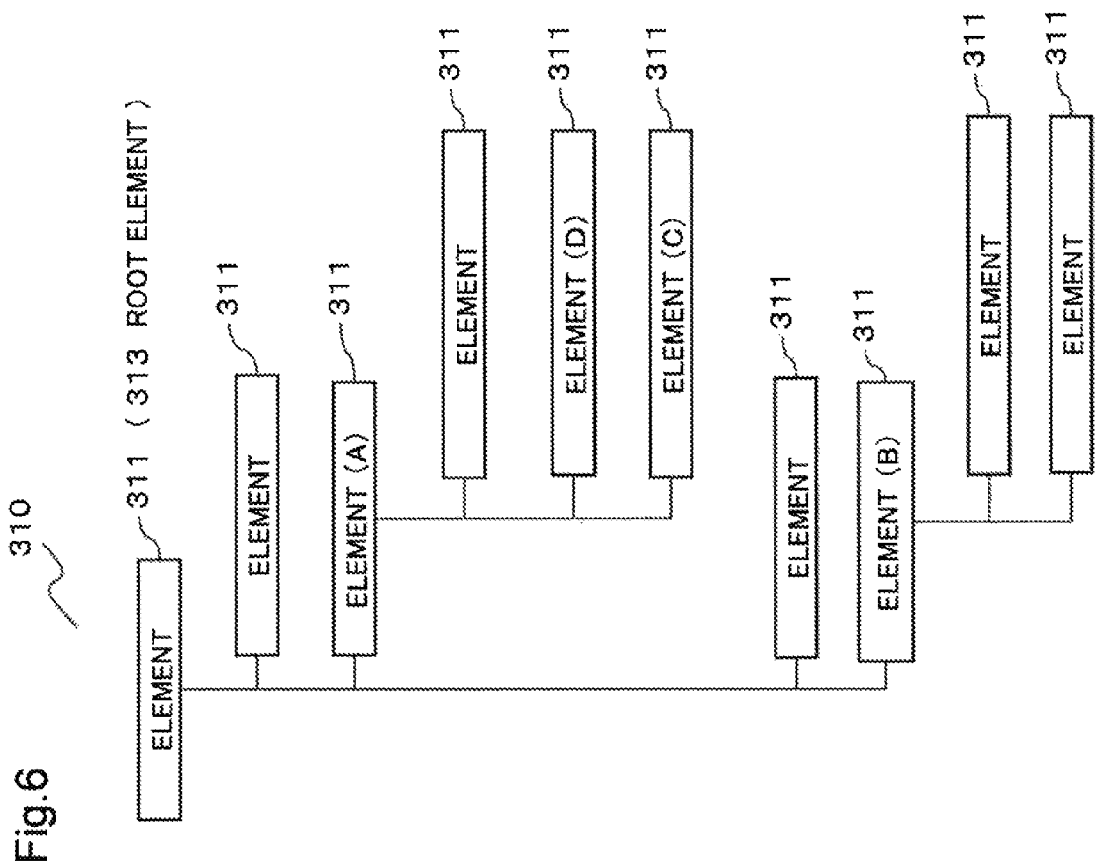
FIG. 6 is a figure of the document tree which indicates an example of operation of an exclusive element confirmation unit in the first to third exemplary embodiments of the present invention.

A specific example will be described with reference to FIG. 6. FIG. 6 is a figure of the document tree 310 for describing an example of operation of the exclusive element confirmation unit 160. Further, in order to describe several elements 311 distinctively in the following description, a suffix is attached to those. For example, the element 311A referred in the following description is indicated as the element (A) in FIG. 6, and it is also similar for other elements 311.

First, it is supposed that the exclusive element storage unit 170 stores at least the element name of "schedule". The element 311A and the element 311B of the document tree 310 shown in FIG. 6 are descriptions about different schedules respectively. And the element 311A and the element 311B include an element 311 of the element name of "schedule" in the respective descendant elements. Accordingly, the exclusive element confirmation unit 160 determines that the identical exclusive element exists in each of the partial trees which use the element 311A and the element 311B as the tops. Henceforth, when the identical exclusive element exists in each of the partial trees which use two elements as the tops, it describes that those two partial trees are "exclusive". Also, when none of the identical exclusive elements exist in each of the partial trees which use two elements 311 as the tops, it is described that those two partial trees are "not exclusive". Further, when two elements 311 are the identical elements 311, for convenience, the exclusive element confirmation unit 160 always determines that these two elements 311 are not exclusive.

Next, the exclusive element storage unit 170 will be described. The exclusive element storage unit 170 stores the exclusive element names as mentioned above.

Figure 8:
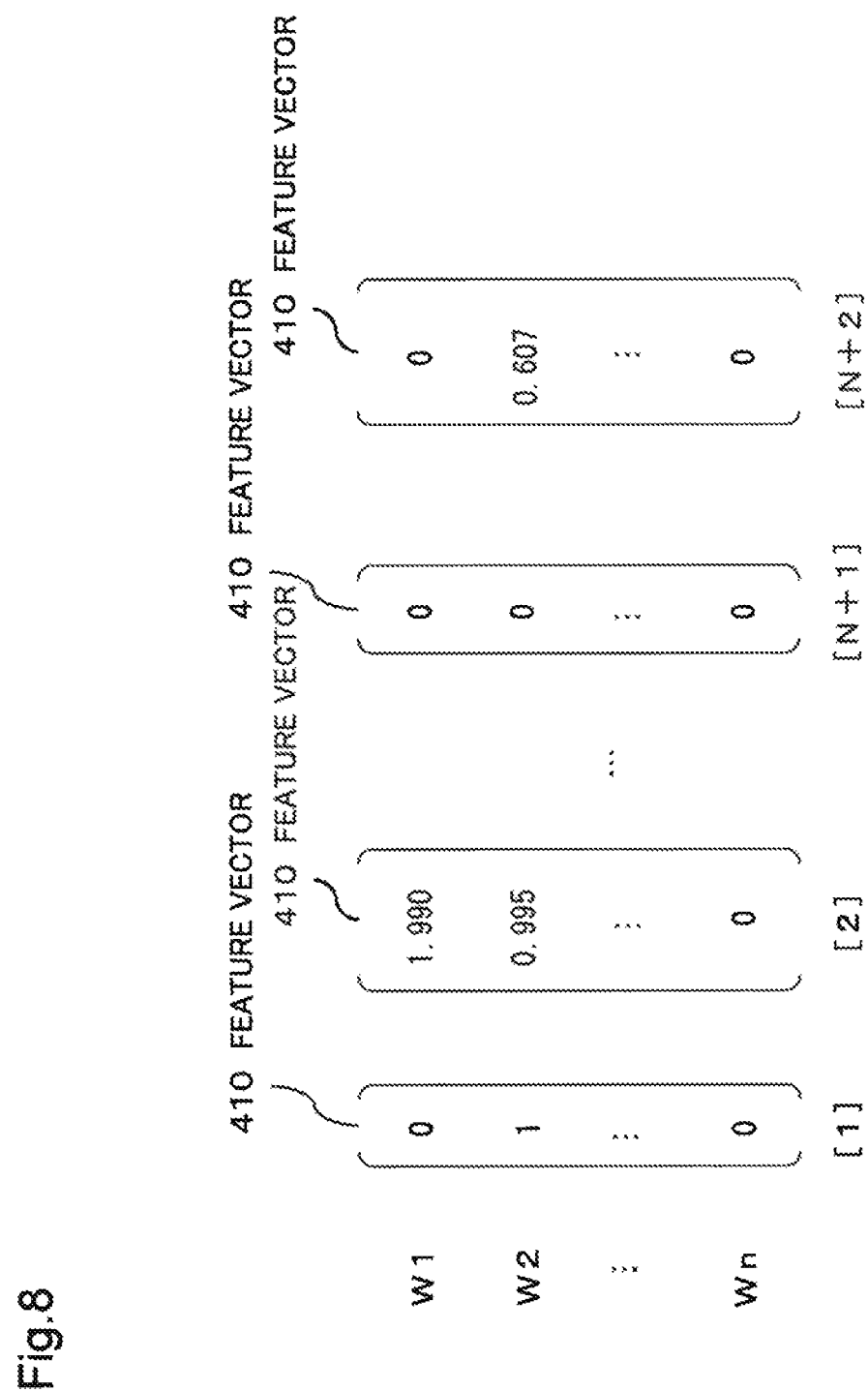
FIG. 8 is a figure showing a structure of an element feature vector in the first to third exemplary embodiments of the present invention.

Next, the feature vector calculation unit 180 will be described. The feature vector calculation unit 180 calculates a feature vector (hereinafter, referred to as "an element feature vector") as shown in FIG. 8 for each element 311 which is the search element having been detected by the search unit 140. And, the feature vector calculation unit 180 generates an accumulated feature vector by successively adding up each of those element feature vectors 410. As shown in FIG. 8, the element feature vector 410 has a plurality of dimensions, and each dimension is uniquely corresponding to a predetermined phrases. For example, the predetermined phrase may be a direction phrase of a general dictionary. And also, the predetermined phrases may be a set of phrases which have been selected with predetermined intention in the specific field.

W1, W2, Wn shown in FIG. 8 is an example of the phrases corresponding to each component (dimension) of the feature vector 410.

A method to calculate the element feature vector 410 will be described. In the element feature vector 410, the value corresponding to each component, i.e., a phrase is the value which is obtained by multiplying a weight for the search element by the number of appearances of the respective phrases. The element feature vector 410 calculates the weight based on information on the inter-element distance between the search element and the extraction target element 312, and whether the search element is exclusive to the extraction target element 312. When the search element is exclusive, the element feature vector 410 treats the weight as "0". Further, when the search element is not exclusive, the element feature vector 410 calculates the weight by the function which decays with increasing the inter-element distance.

For example, this function is exp $(-x^2/(2*tau^2))$, or exp $(-|x|)$ or the like. Here, x is a variable representing the distance, and tau is a constant and it becomes a system parameter. However, these functions are only examples and other function may also be applicable.

Next, the range where the feature vector calculation unit 180 calculates the element feature vector 410 will be described with reference to FIG. 6.

As the premise, it is supposed that the element 311D is being specified as an extraction target element 312.

First, when the search unit 140 has detected the element 311C, the feature vector calculation unit 180 calculates the element feature vector 410 using the phrase appearing in the element 311C. Here, if the element 311C has a child element, and further, a descendant element, the feature vector calculation unit 180 calculates the element feature vector 410 including the phrases appearing in those descendant elements. In this case, the feature vector calculation unit 180 calculates the element feature vector 410 to all phrases by supposing that the weight for the descendant element is also the same and using the weight having been calculated for the element 311C. In other words, the thing calculating in this way is equivalent to process the elements 311 below the element 311C as one large element 311C by ignoring the hierarchy.

Next, when the search unit 140 has detected the element 311A, the feature vector calculation unit 180 calculates the element feature vector 410 only using the phrase appearing in the element 311A.

Next, when the search unit 140 has detected the element 311B, the feature vector calculation unit 180 calculates the element feature vector 410 including the elements 311 below the element 311B just like a case where the descendant elements are included in the element 311C. As it has been described above, when the search element includes the extraction target element 312 in the descendant element, the feature vector calculation unit 180 calculates the element feature vector 410 in the range including only the search element. And, in case of anything else and also in case that the element 311 has the descendant elements, the feature vector calculation means 180 calculates the element feature vector 410 in the range including the search element and those descendant elements.

Finally, the feature vector output unit 190 will be described. The feature vector output unit 190 outputs the partial document feature vector about the extraction target element 312 received from the search unit 140 to outside.

Next, operation of this exemplary embodiment will be described in detail with reference to FIGS. 1 to 8.

Figure 2:
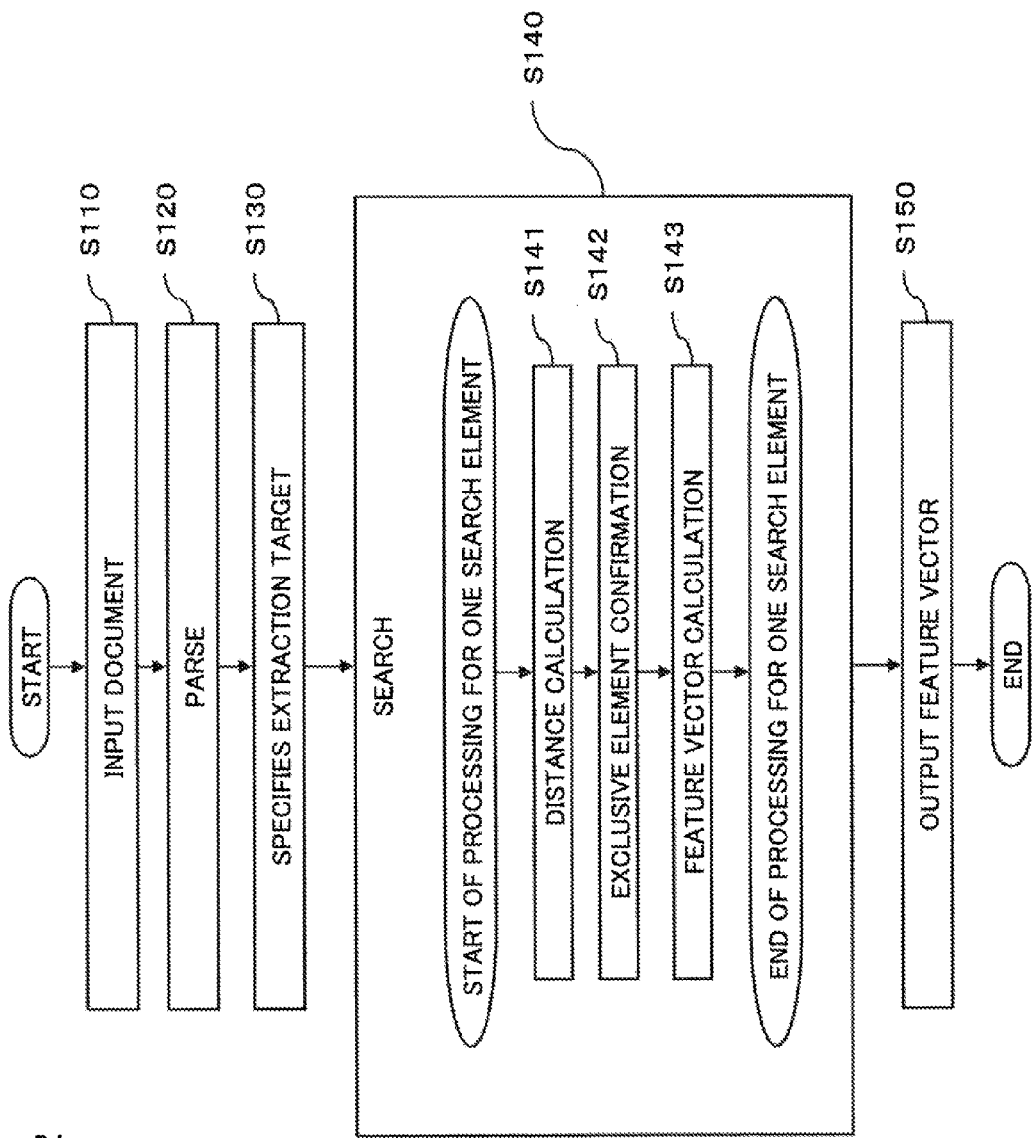
FIG. 2 is a flow chart showing operation of the first exemplary embodiment of the present invention.

FIG. 2 is a flow chart showing an outline of operation of the first exemplary embodiment of the present invention. First, the document input unit 110 inputs the document 300 (Step S110).

Next, the parsing unit 120 receives the document 300 from the document input unit 110, and it parses the received document 300 and expands as the document tree 310 of a tree structure (Step S120).

Next, the extraction target specification unit 130 specifies the extraction target element 312. Although the specifying method is not only one as mentioned above, the extraction target specification unit 130 uniquely specifies the corresponding element 311 in the document tree 310, for example, by a method expressing like "the first element 311 of the element name called "<Schedule>"" (Step S130).

Next, the search unit 140 searches the document tree 310 treating the extraction target element 312 as an initial position, and detects each element 311 existing there one by one as a search element. Continuously, the search unit 140 causes the distance calculation unit 150 to execute processing of distance calculation (Step S141) about the detected search elements. Further continuously, the search means 140 causes the exclusive element confirmation unit 160 to execute processing of exclusive element confirmation (Step S142). More continuously, the search unit 140 causes the feature vector calculation unit 180 to execute processing of feature vector calculation (Step S143). Finally, the search unit 140 detects the last search element of the document tree 310, and causes to execute above-mentioned three kinds of processing for this search element. And, after completion of those, the search unit 140 outputs the accumulated feature vector received from the feature vector calculation unit 180 as the partial document feature vector about the element 311 specified as the extraction target element 312 (Step S140).

Operation of the above-mentioned search unit 140 will be described in detail.

Various methods can be considered for search order. For example, the search unit 140 of this exemplary embodiment begins the search from the extraction target element 312, performs the search of the sibling elements, performs the search of the parent element when having completed the search of the sibling elements, and finishes the search at the root element 313. This search operation is the same as the example of search operation of the search unit 140 described above with reference to FIG. 5.

In the distance calculation (Step S141), the search unit 140 inputs a reference of the search element and a reference of the extraction target element 312 to the distance calculation unit 150 first. Here, the reference is information which specifies the element 311 in the document tree 310 uniquely, and is a storage address of the element 311 and data itself of the element. Next, the distance calculation unit 150 which has received the search element and the extraction target element 312 calculates the inter-element distance between these and outputs. Next, the search unit 140 receives the inter-element distance which the distance calculation unit 150 has output.

In the exclusive element confirmation (Step S142), first, the search unit 140 inputs a reference of the search element and a reference of the element 311, which is an ancestor of the extraction target element 312, and also is the search element or a sibling element of the search element, to the exclusive element confirmation unit 160. Next, the exclusive element confirmation unit 160 which has received these two elements 311 confirms whether these are exclusive or not exclusive, and outputs exclusivity information. Next, the search unit 140 receives the exclusivity information which the exclusive element confirmation unit 160 outputs.

In the feature vector calculation (Step S143), the search unit 140 inputs a reference of the search element, the inter-element distance, and the exclusivity information to the feature vector calculation unit 180 first, and causes to calculate the accumulated feature vector. Next, the search unit 140 receives the accumulated feature vector which the feature vector calculation unit 180 outputs.

Figure 7:
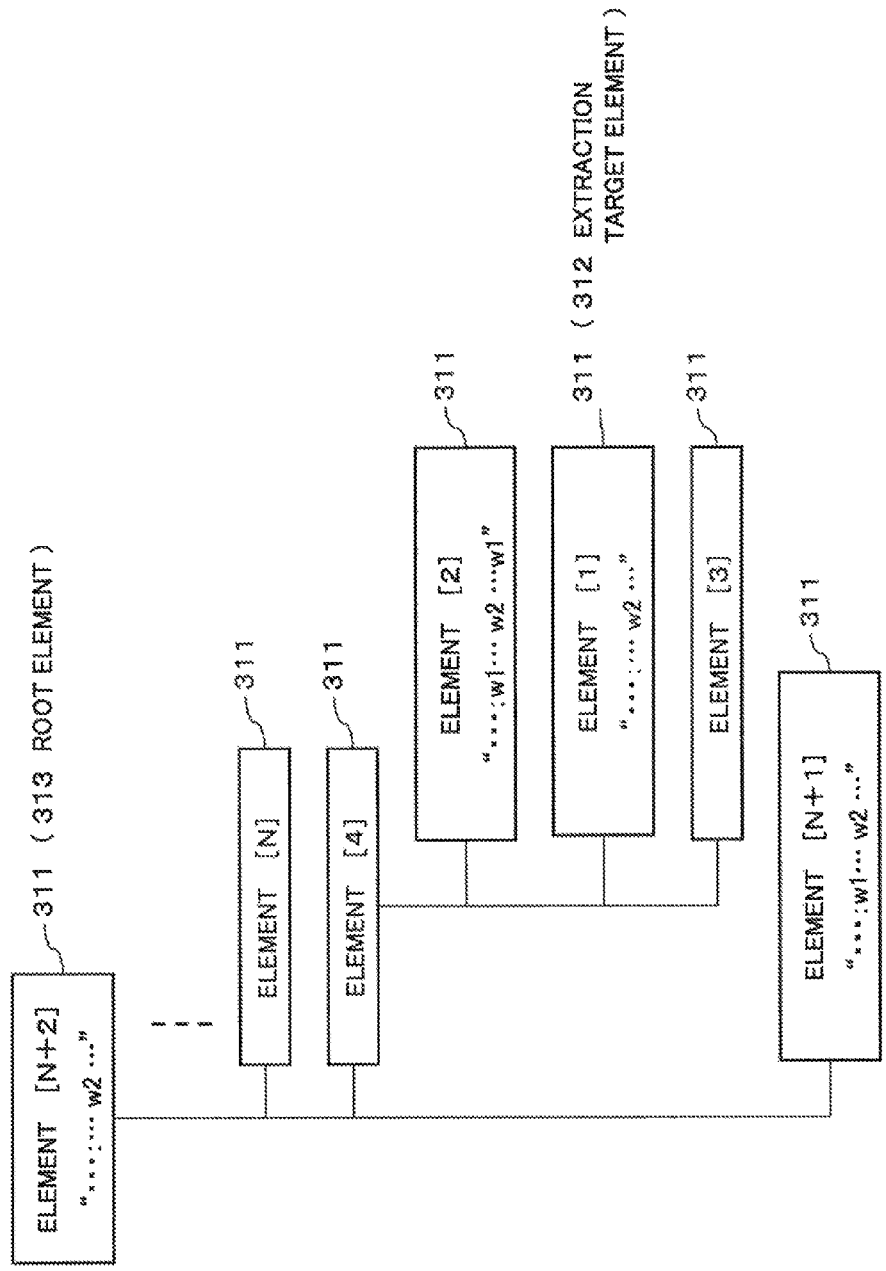
FIG. 7 is a figure of the document tree which indicates an example of operation of a feature vector calculation unit in the first to third exemplary embodiments of the present invention.

Next, three kinds of processing mentioned above will be described specifically with reference to FIG. 7 and FIG. 8. FIG. 7 is a figure of the document tree 310 for describing an example of operation of the feature vector calculation unit. FIG. 8 is a figure showing a structure of the element feature vector 410 as mentioned above.

Here, [1], [2], [N+1] and [N+2] of FIG. 8 indicate suffixes such as [1], [2] or the like in the element 311 shown in FIG. 7.

Further, it will be described by adopting the method 1 mentioned above as the calculation method of the distance, and by adopting $\exp(-x^2/(2*tau^2))$ (where, tau=10) as the weight calculation formula in the feature vector calculation unit 180.

At first, a case where the search unit 140 has detected the element 311 [1] as the search element in the document tree 310 shown in FIG. 7 will be described.

In the distance calculation (step S141), the distance calculation unit 150 receives a reference of the element 311 [1] as the search element and a reference of the element 311 [1] as the extraction target element 312. Continuously, the distance calculation unit 150 calculates the inter-element distance between these. In this case, because it is the distance between the identical elements 311 [1] of each other, the inter-element distance is 0.

In the exclusive element confirmation (step S142), the exclusive element confirmation unit 160 receives a reference of the element 311 [1] as the search element and a reference of the element 311 [1] as the element 311, which is an ancestor of the extraction target element 312, and also is the search element or a sibling element of the search element. Continuously, the exclusive element confirmation unit 160 confirms whether these two elements 311 are exclusive or not exclusive, and outputs the result. In this case, because these two elements 311 are identical elements 311, the exclusive element confirmation unit 160 outputs "not exclusive".

In the feature vector calculation (step S143), the feature vector calculation unit 180 receives a reference of the element 311 [1] which is the search element and the inter-element distance "0" and the exclusivity information indicating not exclusive. And, the feature vector calculation unit 180 creates an element feature vector 410 of the element 311 [1] based on these received information. Because the exclusivity information is indicating not exclusive, the feature vector calculation unit 180 calculates the weight for the phrase in the element 311 [1] as "1" by putting the distance "0" in the weight calculation formula. Accordingly, the feature vector calculation unit 180 calculates the element feature vector 410, which includes the value of "1× number of appearances" as an component, for all phrases which appear in the element 311 [1].

The element feature vector 410 which corresponds to the search order [1] of the element 311 shown in FIG. 8 is the element feature vector 410 calculated for the element 311 [1]. Because, for example, the phrase of "w2" appears once in the element 311 [1] as shown in FIG. 7, the value corresponding to the phrase of "w2" is "1" for the element feature vector 410 of the element 311 [1]. Continuously, the feature vector calculation unit 180 outputs the element feature vector 410 of the element 311 [1] calculated this time as the accumulated feature vector.

Continuously, a case where the search unit 140 has detected the element 311 [2] as the search element in FIG. 7 will be described.

In the distance calculation (Step S141), the distance calculation unit 150 calculates the inter-element distance between the element 311 [2] and the element 311 [1] as "1", in the similar manner to the case of the distance calculation (Step S141) mentioned above.

In the exclusive element confirmation (Step S142), the exclusive element confirmation unit 160 outputs the exclusivity information on the element 311 [1] and the element 311 [2] (for convenience of explanation, it is supposed "not exclusive"), in the similar manner to the case of the exclusive element confirmation (Step S142) mentioned above.

In the feature vector calculation (step S143), the feature vector calculation unit 180 calculates an element feature vector 410 of the element 311 [2], in the similar manner to the case of the feature vector calculation (Step S143) mentioned above. Because the exclusivity information is indicating not exclusive, the feature vector calculation unit 180 calculates the weight for the phrase in the element 311 [2] as "0.995" by putting the distance 1 in the weight calculation formula. Accordingly, the feature vector calculation unit 180 calculates the element feature vector 410 which includes the value of "0.995× number of appearances" as an component for all phrases which appear in the element 311 [2].

The element feature vector 410 which corresponds to the search order [2] of the element 311 shown in FIG. 8 is the element feature vector 410 calculated for the element 311 [2]. For example, as shown in FIG. 7, the phrase of "w1" appears twice and the phrase of "w2" appears once in the element 311 [2]. Accordingly, the value corresponding to the phrase of "w1" and the phrase of "w2" is "1.990" and "0.995" respectively for the element feature vector 410 of the element 311 [2]. And, the feature vector calculation unit 180 outputs the accumulated feature vector in which the element feature vector 410 of the element 311 [2] calculated this time is added to the element feature vector 410 which was calculated for the element 311 [1] which is the first search element.

Further continuously, a case where the search has advanced in several steps, and the search unit 140 has detected the element 311 [N+1] as the search element in FIG. 7 will be described.

In the distance calculation (Step S141), the distance calculation means 150 calculates the inter-element distance between the element 311 [N+1] and the element 311 [1] as "2", in the similar manner to the case of the distance calculation (Step S141) mentioned above.

In the exclusive element confirmation (Step S142), the exclusive element confirmation unit 160 outputs the exclusivity information on the element 311 [N+1] and the element 311 [4] (for convenience of explanation, it is supposed "not exclusive"), in the similar manner to the case of the exclusive element confirmation (Step S142) mentioned above. Here, the element 311 [4] is an ancestor of the element 311 [1] and also a sibling of the element 311 [N+1].

In the feature vector calculation (step S143), the feature vector calculation unit 180 calculates an element feature vector 410 of the element 311 [4], in the similar manner to the case of the feature vector calculation (Step S143) mentioned above. In this case, the feature vector calculation unit 180 calculates the element feature vector 410 as a zero vector because the exclusivity information is indicating exclusive.

The element feature vector 410 which corresponds to the search order [N+1] of the element 311 shown in FIG. 8 is the element feature vector 410 of the element 311 [N+1]. And the feature vector calculation unit 180 outputs the accumulated feature vector which has added up the element feature vector 410 which was calculated for the element 311 [1] of the first search element up to the element feature vector 410 of the element 311 [N+1] calculated this time.

Finally, a case where the search unit 140 has detected the element 311 [N+2] as the search element in FIG. 8 will be described.

In the distance calculation (Step S141), the distance calculation unit 150 calculates the inter-element distance between the element 311 [N+2] and the element 311 [1] as, for example, "10", in the similar manner to the case of the distance calculation (Step S141) mentioned above.

In the exclusive element confirmation (Step S142), the exclusive element confirmation unit 160 outputs the exclusivity information on the element 311 [N+2] and the element 311 [N+2] (for convenience of explanation, it is supposed "not exclusive"), in the similar manner to the case of the exclusive element confirmation (Step S142) mentioned above. Here, the element 311 [N+2] is an ancestor of the element 311 [1].

In the feature vector calculation (step S143), the feature vector calculation unit 180 calculates an element feature vector 410 of the element 311 [N+2], in the similar manner to the case of the feature vector calculation (Step S143) mentioned above. Because the exclusivity information is indicating not exclusive, the feature vector calculation unit 180 calculates the weight for the phrase in the element 311 [N+2] as "0.607" by putting the distance "10" in the weight calculation formula. Accordingly, the feature vector calculation unit 180 calculates the element feature vector 410 which includes the value of "0.607× number of appearances" as an component for all phrases which appear in the element 311 [N+2].

The element feature vector 410 which corresponds to the search order [N+2] of the element 311 shown in FIG. 8 is the element feature vector 410 calculated for the element 311 [N+2]. For example, as shown in FIG. 7, the phrase of "w2" appears once in the element 311 [N+2]. Accordingly, the value corresponding to the phrase of "w2" is "0.607" for the element feature vector 410 of the element 311 [N+2]. And, the feature vector calculation unit 180 outputs the accumulated feature vector which has added up the element feature vector 410 which was calculated for the element 311 [1] of the first search element up to the element feature vector 410 of the element 311 [N+2] calculated this time.

Finally, the feature vector output unit 190 outputs the partial document feature vector about the extraction target element 312 received from the search unit 140 to outside (Step S150).

Next, the first variation example of the first exemplary embodiment will be described.

In the first exemplary embodiment mentioned above, the exclusive element confirmation unit 160 acquires the information on the exclusive element from the exclusive element storage unit 170. In this case, the information on the exclusive element needs to be defined in the system. On the other hand, there are not a few cases that the element 311 specified by the extraction target specification unit 130 is an exclusive element at the same time. Accordingly, the exclusive element confirmation unit 160 may give the name exclusive element to an element name of the element 311 specified by the extraction target specification unit 130. In such cases, it may be configured so as not to include the exclusive element storage unit 170.

Next, the second variation example of the first exemplary embodiment will be described.

In this exemplary embodiment mentioned above, the feature vector calculation unit 180 calculates an element feature vector 410 by treating the weight as "0" or giving the weight based on the distance in accordance with whether the search element and the extraction target element 312 are exclusive or not exclusive. Incidentally, when there is an exclusive element in any one of a plurality of sibling elements, even if there is no exclusive element in other sibling elements, there may be a possibility that the search element is written about different contents.

Accordingly, the feature vector calculation unit 180 may treat the weight as "0" if even one exclusive element exists among the sibling elements of the search element. In such cases, the feature vector calculation unit 180 does not use those sibling elements for calculation of the partial document feature vector if even one element 311 among the sibling elements is an exclusive element.

Next, the third variation example of the first exemplary embodiment will be described.

According to this exemplary embodiment mentioned above, it was supposed that the document input unit 110 accepted a semi-structured document, and the parsing unit 120 analyzed that. However, it may be configured so that the document input unit 110 accepts a general document which is not semi-structuralized, and the parsing unit 120 semi-structuralizes the general document.

Next, the fourth variation example of the first exemplary embodiment will be described.

The feature vector calculation unit 180 may calculate a value to each phrase of the element feature vector 410 first by using the weight for the phrase in the search element in case of each phrase appearing in the search element, and by treating as "0" in case of not appearing. And then, the feature vector calculation unit 180 may extract a component having the maximum value among the components of each dimension of the element feature vector 410 in all search elements and calculate the partial document feature vector which includes these components.

The first effect in this exemplary embodiment mentioned above is a point that it can enable to obtain the feature vector of the partial document having the required precision.

The reason is because it has been arranged so that the element feature vector 410 may be calculated, for the element 311 from the extraction target element 312 to the root element 313, by giving a smaller weight to the phrase of the element 311 having a larger inter-element distance and by treating the weight as 0 for the phrase in the element 311 which is exclusive. That is, it is because, it has been arranged so that the feature vectors may be prevented from being sparse by extracting the phrase in the relevant range with giving the weight, even in a case where phrases of the extraction target element 312 are few.

The second effect in this exemplary embodiment mentioned above is a point that it can enable to make more flexibly to specify of an exclusive element by the exclusive element confirmation unit 160.

The reason is because it has been arranged so that the exclusive element confirmation unit 160 may give the element name of an extraction target element 312 as an element name of an exclusive element.

The third effect in this exemplary embodiment mentioned above is a point that it can enable to make it more difficult to include the feature of information which is not relating to the partial document feature vector.

The reason is because it has been arranged so that the feature vector calculation unit 180 may treat the weight as "0" whenever even one exclusive element exists in a sibling element of the search element.

The fourth effect in this exemplary embodiment mentioned above is a point that it can enable to use a general document, which is not semi-structuralized, as an input.

The reason is because it has been arranged so that the parsing unit 120 may semi-structuralize the general document.

The fifth effect in this exemplary embodiment mentioned above is a point that it can enable to make a calculation of the partial document feature vector which does not depend on the number of appearances of phrase.

The reason is because it has been arranged so that the feature vector calculation unit 180 may calculate each component of the element feature vector 410 only by the weight, and may calculate the partial document feature vector which includes the maximum value among the component values of each dimension of the element feature vector 410 in all search elements.

Second Exemplary Embodiment

Next, the second exemplary embodiment of the present invention will be described in detail with reference to drawings.

Figure 9:
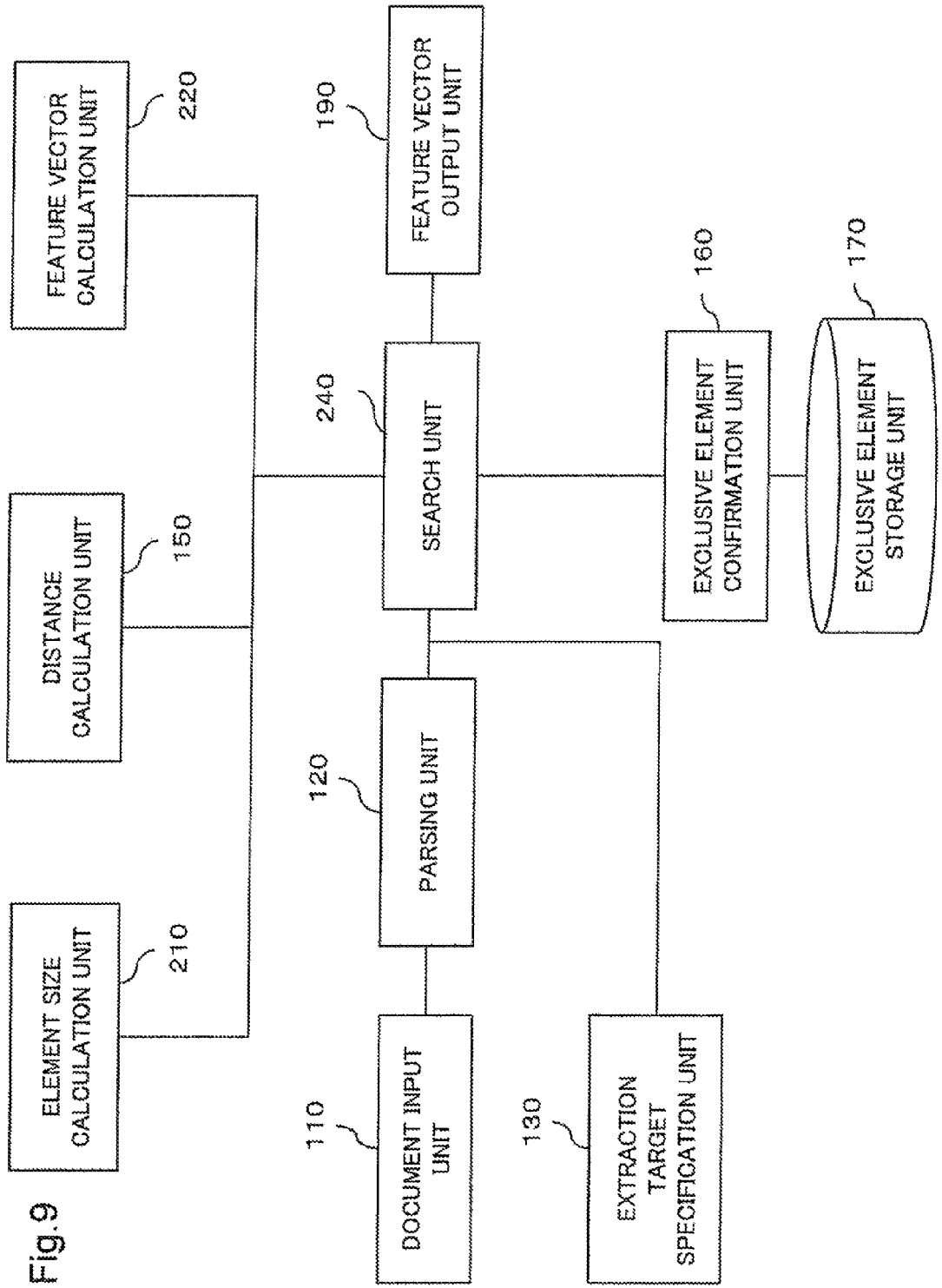
FIG. 9 is a block diagram showing a configuration of the second exemplary embodiment of the present invention.

FIG. 9 is a block diagram showing a configuration of the second exemplary embodiment. As shown in FIG. 9, compared with the first exemplary embodiment, this exemplary embodiment includes an element size calculation unit 210 further, a feature vector calculation unit 220 to replace the feature vector calculation unit 180, and a search unit 240 to replace the search unit 140. Because the document input unit 110, the parsing unit 120, the extraction target specification unit 130, the distance calculation unit 150, the exclusive element confirmation unit 160, the exclusive element storage unit 170 and the feature vector output unit 190 are the same elements as the first exemplary embodiment, each code identical to FIG. 1 is attached and the detailed description will be omitted.

First, the element size calculation unit 210 will be described. The element size calculation unit 210 receives a reference of an element 311. And, in a case where the element 311 includes an extraction target element 312 in the descendant element, the element size calculation unit 210 calculates and outputs the size only of the element 311. In a case where the element 311 does not include the extraction target element 312 in the descendant element, the element size calculation unit 210 calculates and outputs the size including the descendant element of the element 311.

Here, with respect to the definition of the size of element 311, for example, there are a number of phrases which appear in the target element 311, a number of elements 311 themselves and the maximum depth of the elements 311, or the like. Further, these definitions of the size are only examples, and other definition may be applicable.

Next, the feature vector calculation unit 220 will be described. The feature vector calculation unit 220 receives a reference of the search element, the inter-element distance, the size of the search element and search element exclusivity information. And the feature vector calculation unit 220 calculates element feature vectors 410, adds up those element feature vectors 410 each other successively and generates an accumulated feature vector. Here, the search element exclusivity information is any one of the information among following the first, the second and the third.

The first, the search element is an exclusive element.

The second, the search element is not an exclusive element, however, any one of the sibling elements of the search element is an exclusive element.

The third, neither the search element nor any of the sibling elements of the search element is an exclusive element.

The feature vector calculation unit 220 is different in the calculation method of the weight compared with the feature vector calculation unit 180 of the first exemplary embodiment. Accordingly, only the calculation method of the weight will be described below. The weight calculation can be classified into three cases depending on the search element exclusivity information.

The first case, the feature vector calculation unit 220 treats the weight as 0, in a case where the search element is an exclusive element.

The second case, the feature vector calculation unit 220 calculates the weight based on the size and the distance of the search element, in a case where the search element is not an exclusive element, but any one of the sibling elements of the search element is an exclusive element. The calculation formula of the weight is expressed by a function which becomes smaller with increasing the distance, and also becomes smaller with increasing the size. For example, this function is exp $((-[x1x2]'*inv(Sigma)*[x1x2])/2)$, (here, $[x1x2]$ is a column vector, ' is transposition, inv( ) is an inverse matrix, Sigma is a covariance matrix, x1 is the distance and x2 is the size. That is, this is the multi-dimensional normal distribution which has removed the normalization constant). Further, this weight function is only an example and other function may also be applicable.

The third case, in a case where neither the search element nor any of the sibling elements of the search element is an exclusive element, the feature vector calculation unit 220 calculates the weight by the similar formula to the second case with treating the size of the search element as "0".

Next, the search unit 240 will be described. Compared with the search unit 140 of the first exemplary embodiment, it is the same with respect to the searching method but it is different in operation at the time of detection of the search element in the search unit 240. The contents of this operation will describe in detail at the time of the description of operation.

Next, operation of this exemplary embodiment will be described in detail with reference to figures.

Figure 10:
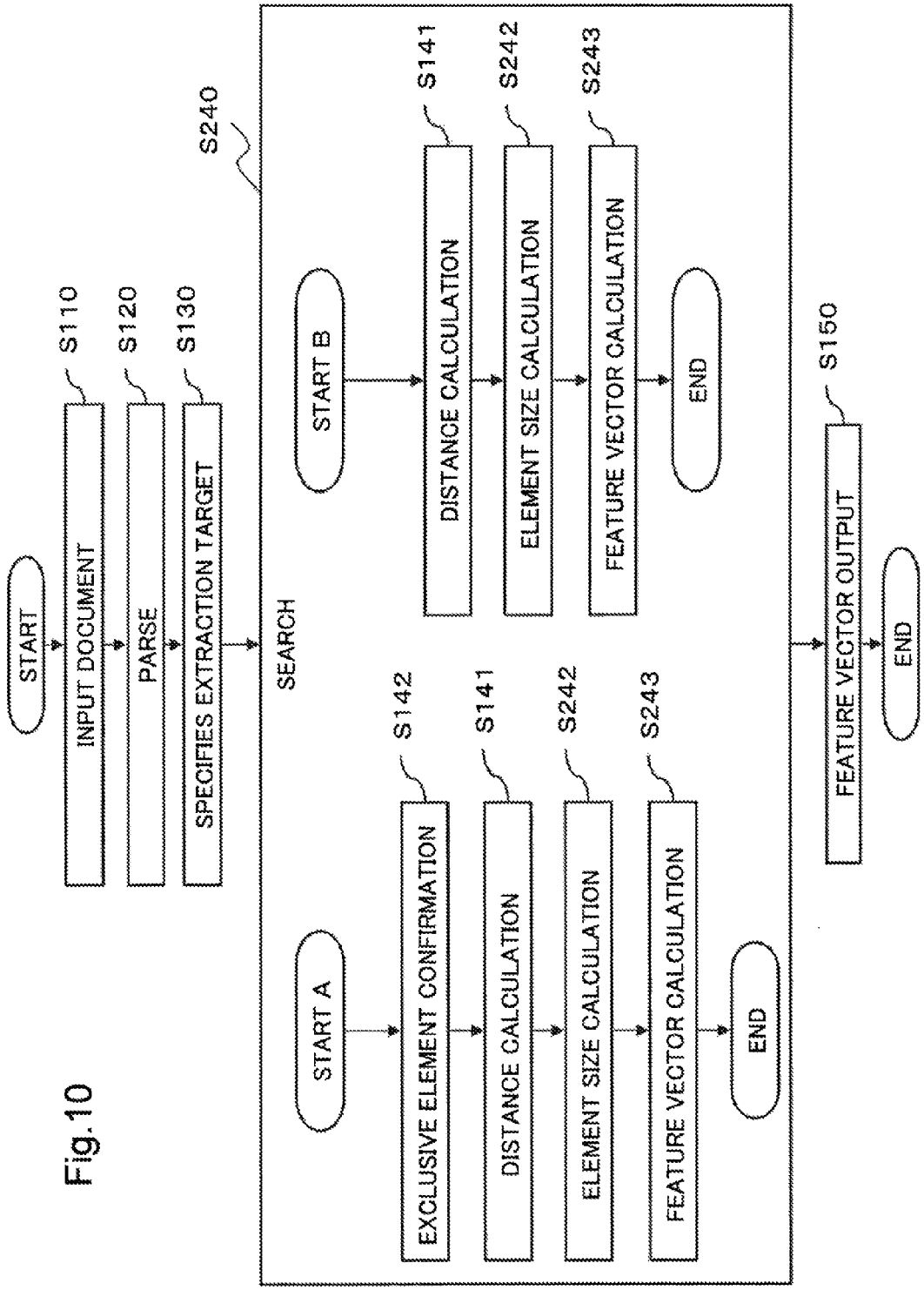
FIG. 10 is a flow chart showing operation of the second exemplary embodiment of the present invention.

FIG. 10 is a flow chart showing an outline of operation of the second exemplary embodiment of the present invention. For the same operation as the first exemplary embodiment, a code identical to FIG. 2 is attached and the detailed description will be omitted.

The difference from the first exemplary embodiment is a search portion (Step S240). This step will be described below.

The search (Step S240) processing can be divided into two cases which include a case where none of the sibling element of search element has been detected yet as a search element and a case where at least any one of the sibling elements of search element has already been detected as a search element.

In FIG. 10, START A (Step S248) indicates start of processing for one of search elements in a case where none of the sibling element of search element has been detected yet as a search element. Also, START B (Step S249) indicates start of processing for one of search elements in a case where at least any one of the sibling elements of search element has already been detected as a search element.

In case of operation from START A, first, the search unit 240 causes the exclusive element confirmation unit 160 to confirm whether it is an exclusive element with respect to the search element and its sibling element. The search unit 240 stores this search element exclusivity information temporarily in order to use when searching the sibling element (Step S142).

Continuously, the search unit 240 causes the distance calculation unit 150 to calculate the inter-element distance between the search element and the extraction target element 312 (Step S141).

Continuously, the search unit 240 causes the element size calculation unit 210 to calculate the size of the search element (Step S242).

Continuously, the search unit 240 causes the feature vector calculation unit 220 to calculate a feature vector (Step S243). At this time, the feature vector calculation unit 220 receives a reference of the search element, the inter-element distance, the search element size and the search element exclusivity information, and calculates the element feature vector 410.

Next, in case of operation from START B, first, the search unit 240 causes the distance calculation unit 150 to calculate the distance between the search element and the extraction target element 312 (Step S141).

Continuously, the search unit 240 causes the element size calculation unit 210 to calculate the size of the search element (Step S242).

Continuously, the search unit 240 causes the feature vector calculation unit 220 to calculate a feature vector (Step S243). Further, the search element exclusivity information required in Step S243 uses something which has already been acquired at Step S142 of operation from START A.

Next, a variation example of the second exemplary embodiment will be described. The second exemplary embodiment may apply the first, the third and the fourth variation examples described in the first exemplary embodiment.

The effect in this exemplary embodiment mentioned above is a point that it can enable to calculate an element feature vector 410 by treating the element 311 as an intermediate state between "exclusive" and "not exclusive", in addition to the effect of the first exemplary embodiment. That is, in a case where there are a plurality of elements 311 which become the sibling elements at a certain place of the document tree 310, and one of these sibling elements is an exclusive element, it can flexibly treat the elements 311 other than the exclusive element among the sibling elements.

The reason is because it has been arranged to calculate the weight based on the size and the distance of the search element in a case where the search element is not an exclusive element but any one of the sibling elements of the search element is an exclusive element.

That is, in the first exemplary embodiment, in a case where one of the sibling elements is an exclusive element similarly, the feature vector calculation unit 220 either uses all the elements 311 other than the exclusive element just as they are for calculation of an element feature vector 410 or does not use any of them. However, in a case where one of the sibling elements is an exclusive element, it cannot determine that other sibling elements are surely exclusive or surely not exclusive.

In the first exemplary embodiment and the second variation example of the first exemplary embodiment, it determined either of "surely exclusive" or "surely not exclusive". Therefore, in the second exemplary embodiment, the element size has been introduced in addition to the inter-element distance, and it has been arranged to express an intermediate state by making the weight becomes smaller with increasing the element size.

This is using the tendency that when the element size becomes large to some extent (the size of the sentence becomes large), the content is concluded in it, and a possibility of exclusion (different in the contents) with other element (with document) becomes high.

Third Exemplary Embodiment

Next, the third exemplary embodiment of the present invention will be described in detail with reference to drawings. This exemplary embodiment is an embodiment including only the basic components of the present invention.

Figure 11:
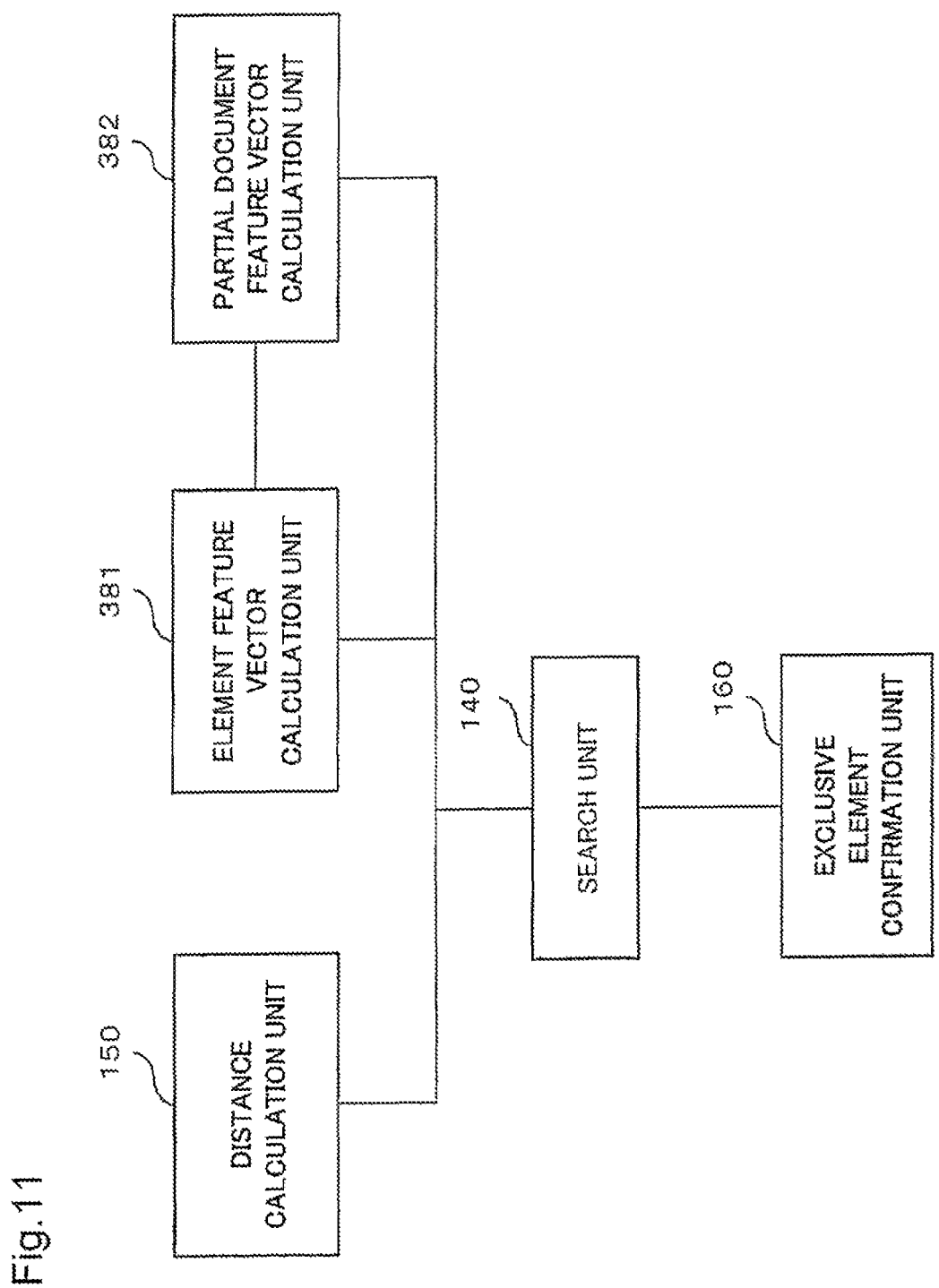
FIG. 11 is a block diagram showing a configuration of the third exemplary embodiment of the present invention.

FIG. 11 is a block diagram showing a configuration of the third exemplary embodiment. As shown in FIG. 11, this exemplary embodiment includes a search unit 140, a distance calculation unit 150, an exclusive element confirmation unit 160, an element feature vector calculation unit 381 and a partial document feature vector calculation unit 382.

The search unit 140 searches a document tree 310 having a plurality of elements 311 according to a rule give in advance, and sequentially detects the element 311 as a search element.

The distance calculation unit 150 calculates an inter-element distance between an extraction target element 312 specified in advance among a plurality of elements 311 of the document tree 310 and the search element.

The exclusive element confirmation unit 160 generates exclusivity information which indicates whether the search element is an exclusive element to the extraction target element 312 with reference to an exclusive element name specified in advance.

The element feature vector calculation unit 381 calculates a weight for a phrase included in this element 311 corresponding to the element 311 based on the inter-element distance and the exclusivity information. Next, the element feature vector calculation unit 381 calculates an element feature vector 410 corresponding to the search element based on this calculated weight. Further, the element feature vector 410 has a plurality of dimensions, and each dimension uniquely corresponds to the phrase which appears in any of the elements 311 of the document tree 310.

The partial document feature vector calculation unit 382 calculates a feature vector of a partial document related to the extraction target element 312 based on the element feature vector 410.

The effect in this exemplary embodiment mentioned above is a point that the feature vector of the partial document having required precision can be obtained.

The reason is because it has been arranged to calculate the partial document feature vector based on the element feature vector 410 which had been calculated based on the distance and the exclusivity between elements.

Each component described in each exemplary embodiment mentioned above may be configured, for example, by a program which causes a computer to execute predetermined processing. Also, each component described in each exemplary embodiment mentioned above may be realized, for example, by hardware, may be realized by software, or may be realized by mixture of hardware and software.

Moreover, each component described in each exemplary embodiment mentioned above is not necessarily an independent existence. For example, it may be a configuration such that one module is realized by a plurality of components, or one component is realized by a plurality of modules. Also, for example, a certain component is a part of the other component, and a part of a certain component is overlapped to a part of the other component.

While this invention has been particularly shown and described with reference to exemplary embodiments (and embodiments) thereof, the invention is not limited to those specific exemplary embodiments (and embodiments). It will be understood by those of ordinary skill in the art that various changes in form and details may be made therein without departing from the spirit and scope of the present invention.

This application is based upon and claims the benefit of priority from Japanese Patent Application No. 2009-150107, filed on Jun. 24, 2009, the disclosure of which is incorporated herein in its entirety by reference.

DESCRIPTION OF THE REFERENCE NUMERALS

110 Document input unit
120 Parsing unit
130 Extraction target specification unit
140 Search unit
150 Distance calculation unit
160 Exclusive element confirmation unit
170 Exclusive element storage unit
180 Feature vector calculation unit
190 Feature vector output unit
210 Element size calculation unit
220 Feature vector calculation unit
240 Search unit
300 Document
310 Document tree
311 Element
312 Extraction target element
313 Root element
381 Element feature vector calculation unit
381 Partial document feature vector calculation unit
410 Element feature vector

The invention claimed is:

1. A computer-implemented feature extraction device comprising:
   a search unit which searches a document tree having a plurality of elements according to a rule given in advance, and sequentially detects an element of said plurality of elements as a search element;
   a distance calculation unit which calculates an inter-element distance between an extraction target element specified in advance among a plurality of elements of said document tree and said search element;
   an exclusive element confirmation unit which generates exclusivity information which indicates whether said search element is an exclusive element to said extraction target element, with reference to an exclusive element name specified in advance;
   an element feature vector calculation unit which calculates a weight for a phrase included in the element corresponding to said element based on the inter-element distance and said exclusivity information, and calculates an element feature vector, having a plurality of dimensions and each dimension uniquely corresponding to a predetermined phrase, based on the calculated weight corresponding to each search element; and
   a partial document feature vector calculation unit which calculates a partial document feature vector of a partial document related to said extraction target element based on said element feature vector.

2. The feature extraction device according to claim 1, wherein said exclusive element confirmation unit refers to an element name of said extraction target element as an exclusive element name.

3. The feature extraction device according to claim 1, wherein said exclusive element confirmation unit generates said exclusivity information which indicates that said search element is an exclusive element, in a case where said element having said exclusive element name exists both; in either of said extraction target element or a descendant element of the extraction target element; and in either of said search element or a descendant element of the search element.

4. The feature extraction device according to claim 1, wherein said element feature vector calculation unit calculates with treating said weight as 0 in a case where said exclusivity information is indicating that said search element is an exclusive element.

5. The feature extraction device according to claim 1,
   wherein said element feature vector calculation unit calculates a value of component of each dimension by multiplying said weight and a number of appearances in said search element of the phrase corresponding to said each dimension, and calculates the element feature vector corresponding to said search element, and
   wherein said partial document feature vector calculation unit calculates said partial document feature vector by adding up all of the plurality of said element feature vectors.

6. The feature extraction device according to claim 1,
   wherein said element feature vector calculation unit performs calculation with treating a value to each component of said element feature vector as the weight for the phrase in the search element in case of the corresponding phrase appears in the search element, and as 0 in case of not appearing; and
   wherein said partial document feature vector calculation unit extracts the component having the maximum value among the components of respective dimensions of the element feature vector corresponding to all of said search elements and calculates said partial document feature vector including the value of the extracted component.

7. The feature extraction device according to claim 1, wherein said exclusive element confirmation unit generates said exclusivity information which indicates that the search element is an exclusive element, in a case where said element having said exclusive element name exists both in either of said extraction target element or the descendant element of the extraction target element, and in either of said search element, the descendant element of the search element, the sibling element of the search element, or the descendant element of the sibling element.

8. The feature extraction device according to claim 1, further comprising:
   an element size calculation unit which calculates a size of said element based on a definition given in advance of the size, and
   wherein said element feature vector calculation unit calculates said weight based on said inter-element distance, said exclusivity information and said size.

9. The feature extraction device according to claim 1, further comprising:
   an exclusive element storage unit which stores said exclusive element name, and
   wherein said exclusive element confirmation unit refers to the exclusive element name stored in said exclusive element storage unit.

10. The feature extraction device according to claim 1, further comprising:
    a parsing unit which analyzes a tree structure of a semi-structured document and generates said document tree.

11. The feature extraction device according to claim 10, wherein said parsing unit semi-structuralizes a general document.

12. The feature extraction device according to claim 1, further comprising:

an extraction target specification unit which specifies any one of elements in said document tree as said extraction target element.

13. The feature extraction device according to claim 1, further comprising:
a document input unit which inputs a document.

14. The feature extraction device according to claim 1, further comprising:
a feature vector output unit which outputs the partial document feature vector.

15. A feature extraction method comprising:
searching a document tree having a plurality of elements according to a rule given in advance, and sequentially detecting said an element of said plurality of elements as a search element;
calculating an inter-element distance between an extraction target element specified in advance among a plurality of elements of said document tree and said search element;
generating exclusivity information which indicates whether said search element is an exclusive element to said extraction target element, with reference to an exclusive element name specified in advance;
calculating a weight for a phrase included in the element corresponding to said element based on the inter-element distance and said exclusivity information, and calculating an element feature vector, having a plurality of dimensions and each dimension uniquely corresponding to a predetermined phrase, based on the calculated weight corresponding to each search element; and
calculating a partial document feature vector of a partial document related to said extraction target element based on said element feature vector.

16. The feature extraction method according to claim 15, wherein said generating of exclusivity information includes,
referring to an element name of said extraction target element as an exclusive element name.

17. The feature extraction method according to claim 15, wherein said generating of exclusivity information includes,
generating said exclusivity information which indicates that said search element is an exclusive element, in a case where said element having said exclusive element name exists both: in either of said extraction target element or a descendant element of the extraction target element; and in either of said search element or a descendant element of the search element.

18. The feature extraction method according to claim 15, wherein said calculating an element feature vector includes,
calculating with treating said weight as 0 in a case where said exclusivity information is indicating that said search element is an exclusive element.

19. The feature extraction method according to claim 15, wherein said calculating an element feature vector includes,
calculating a value of component of each dimension by multiplying said weight and a number of appearances in said search element of the phrase corresponding to said each dimension, and calculating an element feature vector corresponding to said search element, and
wherein said calculating a partial document feature vector includes,
calculating said partial document feature vector by adding up all of the plurality of said element feature vectors.

20. A computer readable non-transitory recording medium having embodied thereon a program for causing a computer to execute:
search element detection processing for searching a document tree having a plurality of elements according to a rule given in advance, and sequentially detecting said an element of said plurality of elements as a search element;
inter-element distance calculation processing for calculating an inter-element distance between an extraction target element specified in advance among a plurality of elements of said document tree and said search element;
exclusivity information generation processing for generating exclusivity information which indicates whether said search element is an exclusive element to said extraction target element, with reference to an exclusive element name specified in advance;
element feature vector calculation processing for calculating a weight for a phrase included in the element corresponding to said element based on the inter-element distance and said exclusivity information, and calculating an element feature vector, having a plurality of dimensions and each dimension uniquely corresponding to a predetermined phrase, based on the calculated weight corresponding to each search element; and
partial document feature vector calculation processing for calculating a partial document feature vector of a partial document related to said extraction target element based on said element feature vector.

* * * * *